United States Patent
Kato

(10) Patent No.: US 8,212,773 B2
(45) Date of Patent: Jul. 3, 2012

(54) MOUSE

(75) Inventor: Yumi Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 12/349,820

(22) Filed: Jan. 7, 2009

(65) Prior Publication Data

US 2009/0174662 A1 Jul. 9, 2009

(30) Foreign Application Priority Data

Jan. 9, 2008 (JP) ................. P2008-002629

(51) Int. Cl.
G06F 3/033 (2006.01)
G06K 9/00 (2006.01)

(52) U.S. Cl. ......... 345/163; 382/115; 382/116; 382/124

(58) Field of Classification Search .......................... None
See application file for complete search history.

(56) References Cited

U.S. PATENT DOCUMENTS

| | | | | |
|---|---|---|---|---|
| 5,229,764 | A * | 7/1993 | Matchett et al. | 340/5.52 |
| 5,392,367 | A * | 2/1995 | Hsu et al. | 382/228 |
| 6,193,153 | B1 * | 2/2001 | Lambert | 235/380 |
| 6,337,919 | B1 * | 1/2002 | Dunton | 382/124 |
| 6,850,632 | B1 * | 2/2005 | Boyd et al. | 382/124 |
| 7,119,791 | B2 * | 10/2006 | Iwasaki | 345/163 |
| 7,174,032 | B2 * | 2/2007 | Takiguchi et al. | 382/115 |
| 7,359,531 | B2 * | 4/2008 | Endoh et al. | 382/115 |
| 7,680,305 | B2 * | 3/2010 | Miura et al. | 382/115 |
| 7,719,519 | B2 * | 5/2010 | Blythe | 345/166 |
| 7,769,210 | B2 * | 8/2010 | Ito | 382/115 |
| 7,903,847 | B2 * | 3/2011 | Higuchi | 382/126 |
| 8,131,026 | B2 * | 3/2012 | Benkley et al. | 382/124 |
| 2001/0026632 | A1 * | 10/2001 | Tamai | 382/116 |
| 2004/0022421 | A1 | 2/2004 | Endoh et al. | |
| 2004/0183823 | A1 * | 9/2004 | Wang | 345/699 |
| 2005/0185847 | A1 * | 8/2005 | Rowe | 382/224 |
| 2006/0023921 | A1 * | 2/2006 | Saitoh et al. | 382/115 |
| 2006/0115129 | A1 * | 6/2006 | Abe | 382/115 |
| 2006/0182318 | A1 * | 8/2006 | Shigeta | 382/124 |
| 2006/0232546 | A1 * | 10/2006 | Yamazaki et al. | 345/104 |
| 2007/0036400 | A1 * | 2/2007 | Watanabe et al. | 382/124 |
| 2008/0112600 | A1 * | 5/2008 | Miura et al. | 382/125 |
| 2008/0183707 | A1 * | 7/2008 | Asano | 707/6 |
| 2008/0298642 | A1 * | 12/2008 | Meenen | 382/115 |

FOREIGN PATENT DOCUMENTS

JP 05-25529 U 4/1993

(Continued)

OTHER PUBLICATIONS

Japanese Office Action dated Nov. 15, 2011 issued in counterpart Japanese Patent Application No. 2008-002629 (4 pages).

*Primary Examiner* — Dismery Mercedes

(74) *Attorney, Agent, or Firm* — Finnegan, Henderson, Farabow, Garrett & Dunner, L.L.P.

(57) ABSTRACT

There is disclosed a mouse including: an obtaining unit that obtains a vein image; a generation determination unit that determines a predetermined generation from the vein image; and a setting switch unit that switches content of settings, which is set in a computer connected through a predetermined transfer path, to content of settings assigned to the generation determined by the generation determination unit.

11 Claims, 14 Drawing Sheets

FOREIGN PATENT DOCUMENTS

| | | |
|---|---|---|
| JP | 11-203452 A | 7/1999 |
| JP | 2001-273497 A | 10/2001 |
| JP | 2003-085540 A | 3/2003 |
| JP | 2004-62826 | 2/2004 |
| JP | 2004-329826 A | 11/2004 |
| JP | 2005-258555 A | 9/2005 |
| JP | 2006-023953 A | 1/2006 |
| JP | 2007-183798 A | 7/2007 |

* cited by examiner

MOUSE

CROSS REFERENCES TO RELATED APPLICATIONS

The present invention contains subject matter related to Japanese Patent Application JP2008-002629 filed in the Japanese Patent Office on Jan. 9, 2008, the entire contents of which being incorporated herein by reference.

BACKGROUND OF THE INVENTION

1. Field of the Invention

The present invention relates to a mouse which is suitably used, for example, as an input device for personal computers.

2. Description of the Related Art

There are needs for techniques of displaying enlarged characters on a display screen of a personal computer or a mobile phone in view of aged people who are presbyopic and are not able to have a good near sight.

In case of such a personal computer, users are required to change content of display settings by themselves in order to display enlarged characters on the display screen. Users are hence forced to carry out a complex operation. However, since display settings are difficult for users to change, users often fail in changing content of display settings to result in inconveniences.

On the other hand, there have been proposals for mice of a type as input devices for personal computers. In mice of this type, an authentication device for biometric authentication is provided internally. When a user touches a mouse of this type on his or her palm, an image of blood vessels in the palm are then picked up, and pattern information expressing a characteristic of blood vessels in a blood vessel image obtained is generated as a result. The blood vessel pattern information is compared with preregistered blood vessel pattern information, and the user is thereby authenticated (refer to, e.g., Patent Document 1: Jpn. Pat. Appln. Laid-Open Publication No. 2004-62826).

SUMMARY OF THE INVENTION

Better conveniences are expectable if content of settings for a display screen of a personal computer can be switched automatically by using blood vessel images.

The present invention has been made in view of the above circumstances and proposes a convenient mouse.

According to an aspect of the present invention, there is provided a mouse including: an obtaining unit that obtains a vein image; a generation determination unit that determines a predetermined generation from the vein image; and a setting switch unit that switches content of settings, which is set in a computer connected through a predetermined transfer path, to content of settings assigned to the generation determined by the generation determination unit.

According to the present invention, a predetermined generation is determined from a vein image, and then, content of settings for a computer connected through a predetermined transfer path is switched depending on the predetermined generation. Therefore, the content of settings for the computer can be automatically switched depending on the predetermined generation, without causing users to change the content of settings for the computer at all. Accordingly, a mouse which provides excellent conveniences can be achieved.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

An embodiment of the present invention will now be described in detail with reference to the drawings.

(1) First Embodiment (1-1) Structure of Personal Computer Device

Figure 1:
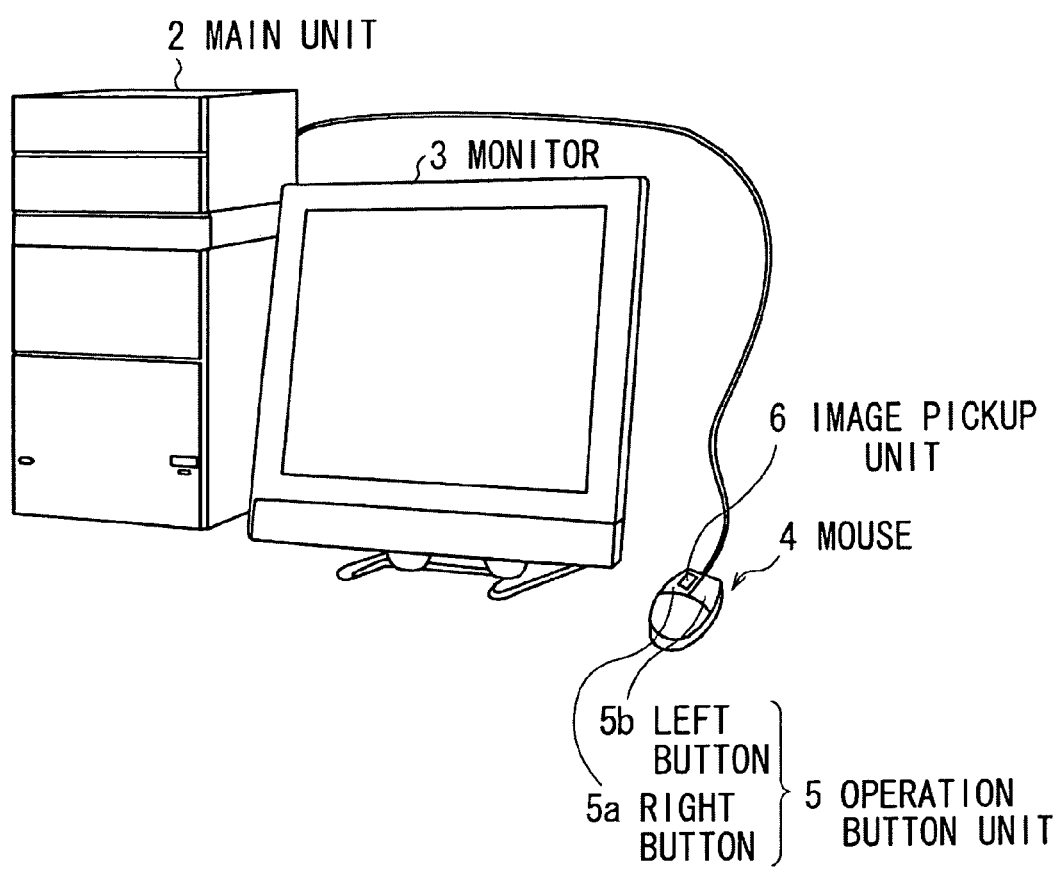
FIG. 1 is a schematic view showing a personal computer device according to a first embodiment of the present invention.

FIG. 1 shows an overall structure of a personal computer device 1 according to the first embodiment. The personal computer device 1 is constituted by connecting a monitor 3 and a mouse 4 to a main unit 2 which totally controls the personal computer device 1. The monitor 3 serves to display characters and figures on a display screen, based on display data supplied from the main unit 2. The mouse 4 serves as an input device.

In the mouse 4, a left button 5a and a right button 5b are formed as an operation button unit 5 at a area where a forefinger or middle finger of a user is put when the user holds the mouse 4, covering an upper surface of the mouse 4 with a palm of the user. An image pickup unit 6 is provided in the left button 5a.

Usually, one identical user always puts his or her finger at one substantially identical position on the image pickup unit 6 of the left button 5a whenever the user uses the mouse 4.

(1-2) Circuit Configuration of Mouse

Figure 2:
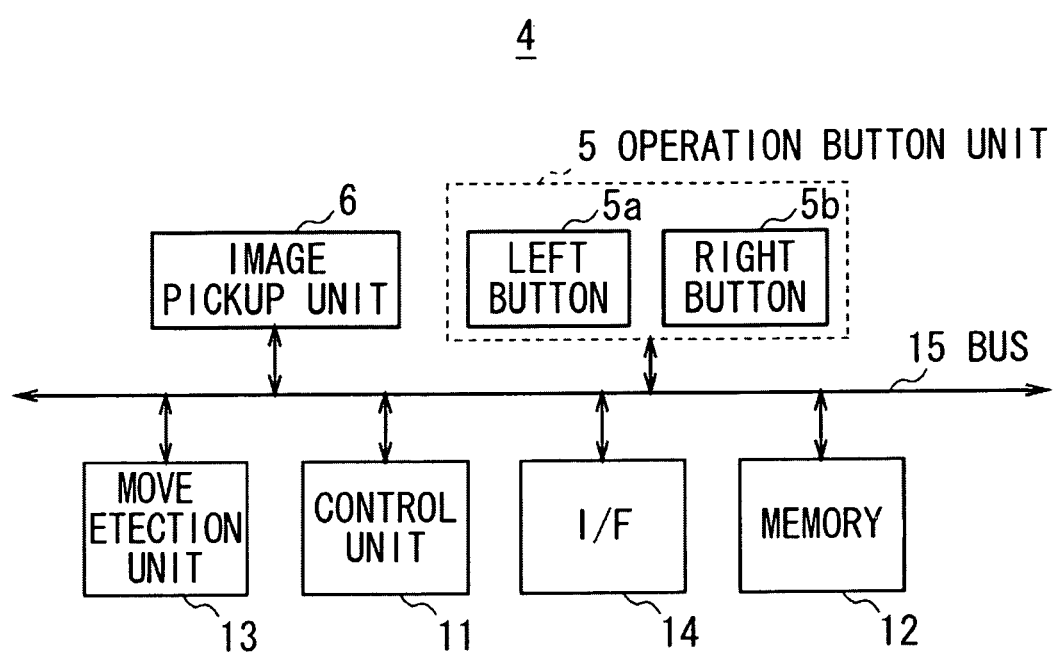
FIG. 2 is a schematic diagram showing a circuit configuration of a mouse according to the first embodiment.

As shown in FIG. 2, the mouse 4 is constituted by connecting, to a control unit 11, the operation button unit 5, the image pickup unit 6, a main memory 12, a move detection unit 13, and an interface 14 each through a bus 15.

The control unit 11 is constituted as a micro computer including a central processing unit (CPU), a read only memory (ROM), and a random access memory (RAM). The CPU totally controls the entire mouse 4. The ROM stores various programs and setting information. The RAM is used as a work memory for the CPU.

The control unit 11 properly controls the image pickup unit 6, memory 12, move detection unit 13, and interface 14 by reading a program stored in the ROM and executing the program on the RAM.

When the left and the right buttons 5a and 5b are manipulated, the operation button unit 5 sends respectively left and right button signals corresponding to manipulations, to the control unit 11.

The move detection unit 13 is constituted of a light emitting diode (LED) and an optical sensor. The move detection unit 13 emits illumination light from the LED to a lower surface of the mouse 4 and receives, by the optical sensor, reflection light reflected on a placement surface where the mouse 4 is placed.

The move detection unit 13 sequentially picks up plural images and detects an amount of change in position of the mouse 4 from the plural images, i.e., detects a moving direction and a moving distance. The move detection unit 13 then sends a moving direction signal and a moving distance signal corresponding to the moving direction and moving distance to the control unit 11.

The image pickup unit 6 has a camera which defines an image pickup space to be above an area where a finger is put. The image pickup unit 6 controls a lens position of an optical lens of the camera, a diaphragm value of a diaphragm, and a shutter speed (exposure time) for an image pickup element, with reference to setup values set up by the control unit 11.

The image pickup unit 6 also emits, to above the surface of the left button 5a, light having a wavelength within a wavelength range (700 nm to 900 nm), which has a characteristic of being absorbable uniquely in both of deoxidized hemoglobin and oxidized hemoglobin (the light will be hereinafter referred to as infrared light).

When a finger is put on the left button 5a, the infrared light emitted to the finger by the image pickup unit 6 travels through inside of the finger, reflected and diffused inside the finger. The light then enters, as light projecting an image of blood vessels of the finger, into the image pickup element through a lens and a diaphragm.

The image pickup unit 6 photoelectrically converts the light incident on the image pickup element, and generates and obtains a resultant image of the blood vessels (hereinafter vein image) as data (hereafter vein image data). The image pickup unit 6 sends the vein image data to the control unit 11.

The memory 12 is constituted of, for example, a flash memory and stores or reads data specified by the control unit 11.

Vein information extracted from vein image data of a registration target is stored as registered vein information into the memory 12 by a predetermined registration unit (not shown).

The interface 14 is constituted of, for example, a universal serial bus interface (USB), and exchanges various data with the main unit 2 connected through a predetermined transfer path.

(1-3) Authentication Mode

Next, an authentication mode will be described. When the left button 5a or the right button 5b is recognized as being pressed down or when the move detection unit 13 detects a move operation, the control unit 11 then executes the authentication mode, based on an authentication program stored in the ROM.

Figure 3:
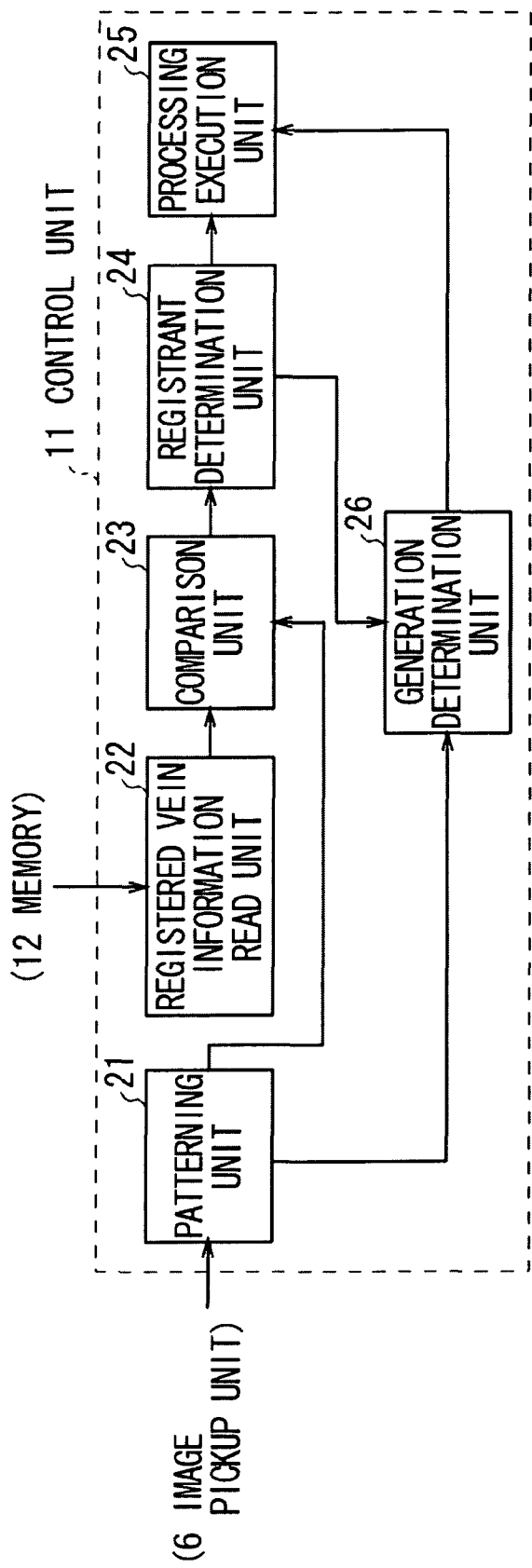
FIG. 3 is a schematic diagram showing a structure of a control unit according to the first embodiment.

In this case, the control unit 11 functions as a patterning unit 21, a registered vein information read unit 22, a comparison unit 23, a registrant determination unit 24, a processing execution unit 25, and a generation determination unit 26, as shown in FIG. 3.

The patterning unit 21 performs an image rotation correction on vein image data by rotating a corresponding vein image so as to parallelize a growth direction of a finger in the vein image data in relation to a reference direction which is a lengthwise direction of a corresponding vein image.

Usually, one identical user always puts his or her finger on one substantially identical position on the image pickup unit 6 of the left button 5a when using the mouse 4. However, the position of the finger inevitably slightly varies at each use. The patterning unit 21 is capable of parallelizing the growth direction of the finger and the lengthwise direction of the vein image. Variants of the position of the finger which are caused at each use can therefore be cancelled.

The patterning unit 21 further extracts vein information of an authentication target by performing the same processing on the vein image data subjected to the image rotation correction as performed in a case of extracting a registered vein image registered in the registration unit.

A method of extracting vein information as described above is to perform a sharpening processing by using a differential filter such as a Gaussian filter or a Laplacian of Gaussian (Log) filter. The patterning unit 21 further binarizes the vein image subjected to sharpening processing, and narrows vein widths of veins to a constant width by referring to centers of veins or peaks of brightness of the veins projected on the binarized vein image. Thus in this embodiment, the patterning unit 21 extracts a binary image of veins having a constant width as vein information from a multi-valued vein image, and sends the extracted vein information to the comparison unit 23.

The registered vein information read unit 22 reads registered vein information registered in the memory 12, and sends the information to the comparison unit 23.

The comparison unit 23 compares the registered vein information sent from the registered vein information read unit 22, with vein information of an authentication target extracted by the patterning unit 21.

The registrant determination unit 24 compares a similarity obtained as a comparison result from the comparison unit 23, with a threshold (hereinafter an authentication threshold) which has been set for the similarity. The similarity may be, for example, a cross correlation value obtained by a cross correlation function, a phase correlation value obtained by a phase correlation function, or a sum of absolute values of unit blocks which is obtained as sum of absolute differences (SAD).

If the similarity obtained as a comparison result from the comparison unit 23 is not smaller than the authentication threshold, the registrant determination unit 24 determines the authentication target to be a registrant. The registrant determination unit 24 then sends an authentication signal (hereinafter an authentication success signal) indicating successful authentication, and also sends this authentication success signal together with the vein information of an authentication target to the generation determination unit 26.

Otherwise, if the similarity obtained as a comparison result from the comparison unit 23 is smaller than the authentication threshold, the registrant determination unit 24 does not determine the authentication target to be a registrant, and sends an authentication signal (hereinafter a authentication failure signal) indicating failed authentication to the processing execution unit 25.

In addition to the configuration as described above, the generation determination unit 26 detects wrinkles included in the vein image data obtained from the patterning unit 21, and also detects an update frequency from the vein information stored in the memory 12. The generation determination unit 26 determines a generation, based on the detected wrinkles and update frequency.

The processing execution unit 25 executes a predetermined processing, depending on the authentication signal sent from the registrant determination unit 24 and the generation determined by the generation determination unit 26.

(1-4) Structure of Generation Determination Unit

Figure 4:
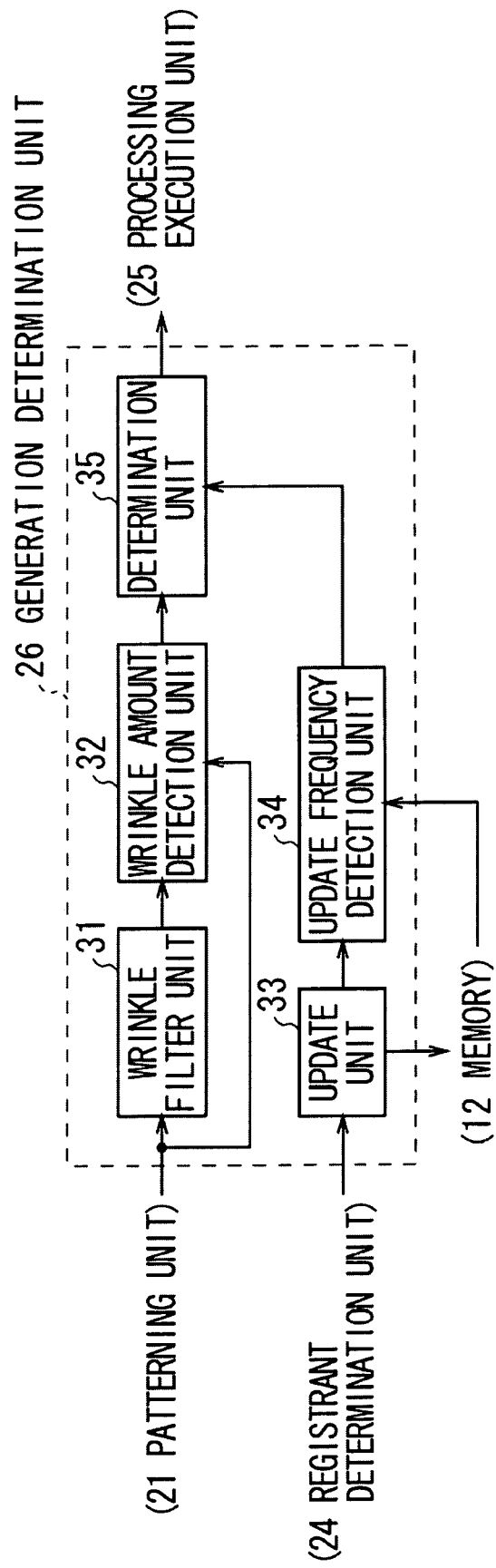
FIG. 4 is a schematic diagram showing a structure of a generation determination unit according to the first embodiment.

Next, the structure of the generation determination unit 26 will be described. As shown in FIG. 4, the generation determination unit 26 is constituted by a wrinkle removing filter 31, a wrinkle amount detection unit 32, an update unit 33, an update frequency detection unit 34, and a determination unit 35.

In the image pickup unit 6, some part of infrared light irradiating a finger is reflected on a surface of the finger and then enters into an image pickup element. Therefore, a vein image which is output from the image pickup unit 6 expresses not only blood vessels inside the finger but also wrinkles, a finger contour, and a finger print.

Figure 5A:
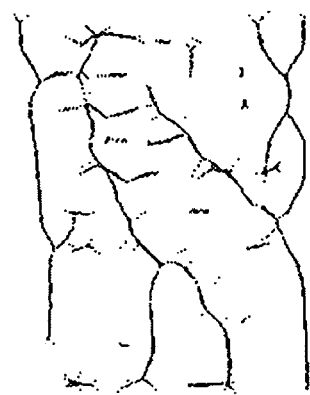
FIGS. 5A, 5B and 5C are schematic diagrams showing states of wrinkle images at a wrinkle removing filter unit.
Figure 5B:
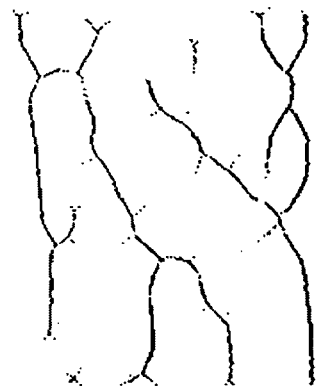
Figure 5C:
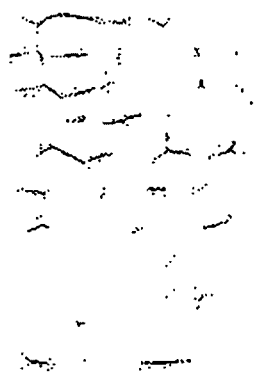
Figure 6:
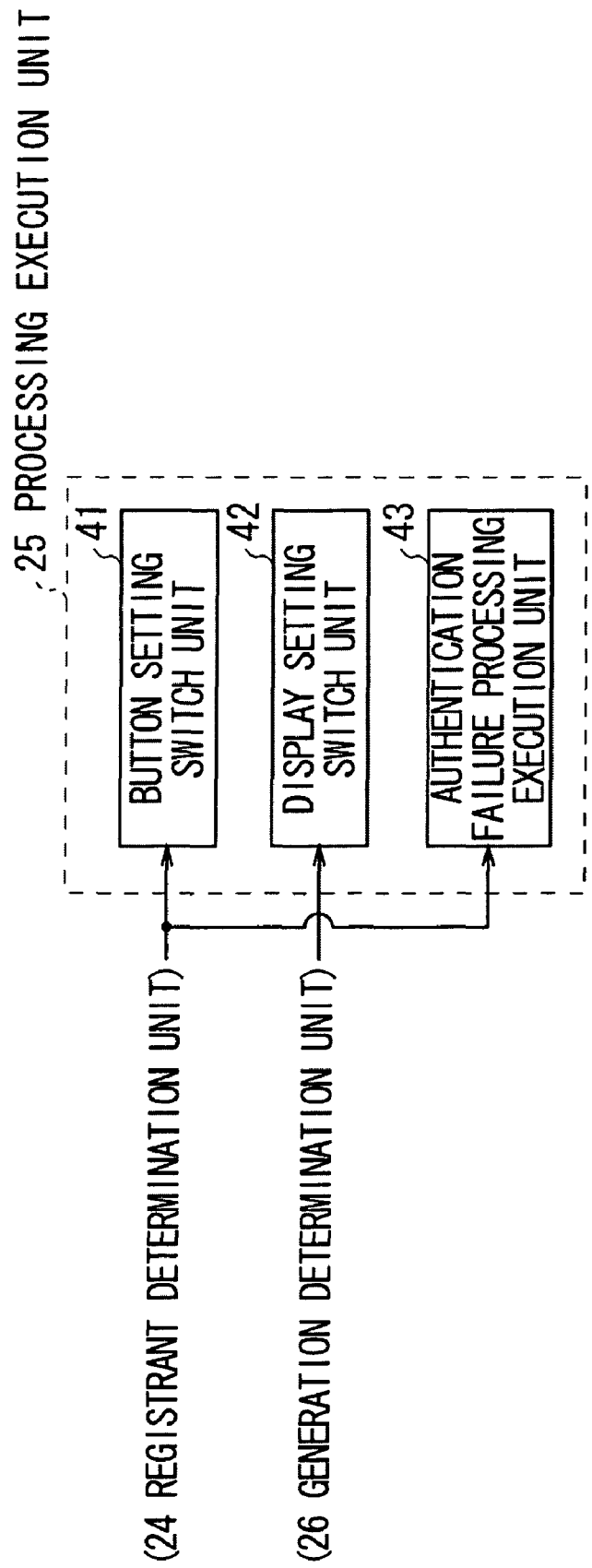
FIG. 6 is a schematic diagram showing a structure of a processing execution unit according to the first embodiment.

The wrinkle removing filter unit 31 obtains vein image data subjected to the image rotation processing from the patterning unit 21, and performs a filter processing on a vein image corresponding to the vein image data. The filter processing is to smoothen brightness levels in a direction orthogonal to the growth direction of the finger. An example of this filter processing will be described with reference to FIG. 5. For explanatory conveniences, background components are removed from FIG. 5.

The wrinkle removing filter unit 31 sets a filter size to sequentially divide the vein image (FIG. 5A), wherein the filter size is longer in the same direction as the growth direction than in the direction orthogonal to the growth direction, such as a filter size of 1×5 pixels. The wrinkle removing filter unit 31 further substitutes a brightness level of a center pixel at the center of the filter size with an average brightness level of pixels in the filter size. In this manner, the wrinkle removing filter unit 31 is capable of dispersing wrinkles appearing in the direction orthogonal to the growth direction from the vein image.

In a procedure of the filter processing on the vein image, the wrinkle removing filter unit 31 sends, to the wrinkle amount detection unit 32, data (hereinafter wrinkle-removed vein image data) of a wrinkle-removed vein image (FIG. 5B) in which wrinkles have been removed from the foregoing vein image.

The wrinkle amount detection unit 32 then calculates a difference in brightness level between each corresponding pixels in the foregoing vein image and the wrinkle-removed vein image. The former vein image corresponds to vein image data which has been supplied form the patterning unit 21 and subjected to the image rotation processing. The latter wrinkle-removed vein image corresponds to wrinkle-removed vein image data which has been supplied from the wrinkle removing filter unit 31. The wrinkle amount detection unit 32 further binarizes a wrinkle image obtained as a result of the foregoing calculation. The wrinkle amount detection unit 32 detects, as a wrinkle amount, a number of pixels forming wrinkles projected in the binarized wrinkle image.

If an authentication success signal is sent as an authentication signal from the registrant determination unit 24, the update unit 33 determines whether the similarity obtained by the comparison unit 23 is equal to or greater than a further greater threshold (hereinafter an update threshold) or not. This update threshold is greater than the authentication threshold which is set for the similarity.

If the similarity is equal to or greater than the update threshold, the similarity implies that vein information of an authentication target does not substantially change from registered vein information in the memory 12.

Otherwise, if the similarity is smaller than the update threshold, the similarity implies that vein information of an authentication target has changed due to aging or so. Accordingly, if veins of the user continue changing in this way, the user may be determined to be a different person from a corresponding registrant in the future. In this case, the update unit 33 overwrites the registered vein information in the memory 12 with the vein information of an authentication target which is given from the registrant determination unit 24.

At this time, the update unit 33 generates data (hereinafter date data) indicating a date when the registered vein information is updated, and stores the date data into the memory 12, associated with the registered vein information.

The update frequency detection unit 34 reads all date data associated with the registered vein information, and detects, as an update frequency, a number of updates which have been carried out within a predetermined period such as one year.

The determination unit 35 determines whether the update frequency detected by the update frequency detection unit 34 is equal to or greater than a reference frequency defined for a child generation or not.

In general, veins in the child generation, which is in a growth process, are known to age rapidly and greatly. Therefore, if the update frequency is equal to or greater than the reference frequency, the update frequency implies that the registered vein information has been updated frequently and that veins are in the child generation in a growth process. In this case, the determination unit 35 sends to the processing execution unit 25 a generation signal (hereinafter a child generation signal) indicating that the user as an authentication target is in the child generation.

Otherwise, if the update frequency is smaller than the reference frequency, the update frequency implies that the registered vein information has not frequently been updated and that the user as an authentication target is not in the child generation. The determination unit 35 then determines whether the wrinkle amount detected by the wrinkle amount detection unit 32 is equal to or greater than a reference amount defined for an aged generation.

In general, wrinkles increase abruptly in a generation around fifty. As a result, in a vein image, wrinkles come to appear in the generation around fifty. Therefore, if the wrinkle amount is equal to or greater than the reference amount, the wrinkle amount implies that the amount of wrinkles in the vein image data of an authentication target is large and that the user as the authentication target is in the aged generation. In this case, the determination unit 35 sends to the processing execution unit 25 a generation signal (hereinafter an aged generation signal) indicating that the user as an authentication target is in the aged generation.

Otherwise, if the wrinkle amount is smaller than the reference amount, the wrinkle amount implies that the user as an authentication target is in a generation between the child and aged generations (hereinafter a middle generation). In this case, the determination unit 35 sends to the processing execution unit 25 a generation signal (hereinafter middle generation signal) indicating that the user as an authentication target is in the middle generation.

(1-5) Configuration of Processing Execution Unit

The processing execution unit 25 will now be described. The processing execution unit 25 is constituted of a button setting switch unit 41, a display setting switch unit 42, and an authentication failure processing execution unit 43.

If an authentication success signal is sent from the registrant determination unit 24, the button setting switch unit 41 reads button setting information associated with registered vein information, form the memory 12.

The button setting information indicates whether a registrant is left-handed or right-handed. For example, button setting information is set up through the main unit 2 when registering registered vein information, and is associated with the registered vein information.

If the button setting information indicates a registrant is right-handed, for example, operations associated with pressing down of the left button 5a and the right button 5b are respectively switched to "enter" and "show menu".

If the button setting information indicates a registrant is left-handed, for example, operations associated with pressing down of the left button 5a and the right button 5b are respectively switched to "show menu" and "enter".

The display setting switch unit 42 has display setting information by which the child generation and the aged generation are associated with content of display settings for the monitor 3. The display setting switch unit 42 switches content of display settings for the monitor 3, which is set in the operation system (OS) of the personal computer device 1, to content of display settings depending on a generation signal supplied from the generation determination unit 26.

Specifically, if a child generation signal is sent from the generation determination unit 26, for example, the display setting switch unit 42 switches the content of display settings so as to additionally show a phonetic script along Chinese characters displayed on the monitor 3.

Otherwise, if an aged generation signal is sent from the generation determination unit 26, for example, the display setting switch unit 42 switches the content of display settings so as to show characters on the monitor 3 at a character size which is greater by a constant rate than a default size. The display setting switch unit 42 also switches the content of display settings so as to raise a brightness level of the monitor 3 which is greater by a constant rate than default level.

Still otherwise, if a middle generation signal is sent from the generation determination unit 26, the display setting switch unit 42 maintains present content of display settings for the monitor 3.

On the other hand, if an authentication failure signal is sent from the registrant determination unit 24, for example, the authentication failure processing execution unit 43 visually notifies the monitor 3 of that the user is not authenticated as a registrant. Present operations associated with pressing down of the left and right buttons 5a and 5b are continuously maintained for the mouse 4, and present content of display settings for the monitor 3 is also maintained.

(1-6) Authentication Processing Procedure

Figure 7A:
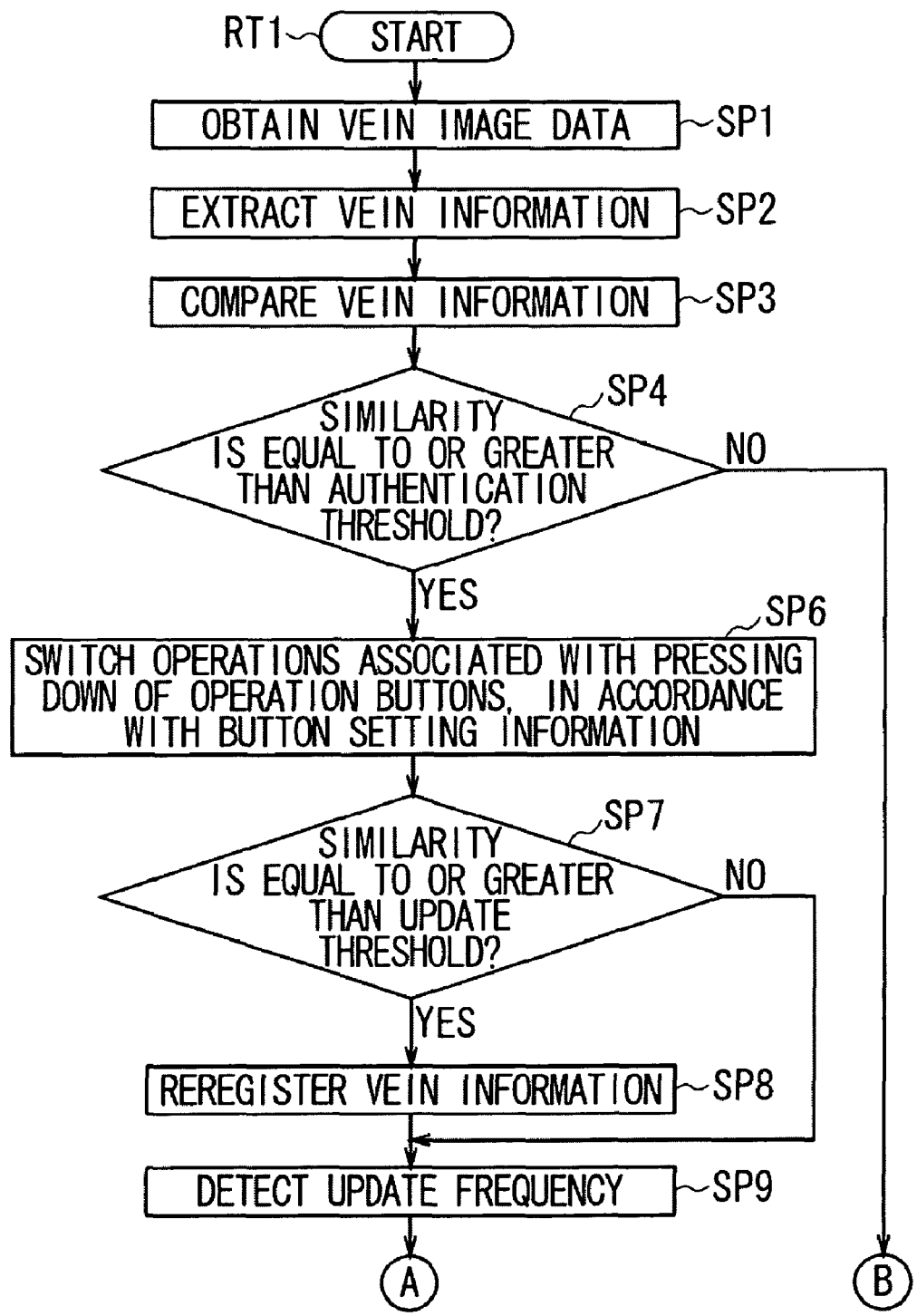
FIGS. 7A and 7B are flowcharts showing an authentication processing procedure according to the first embodiment.
Figure 7B:
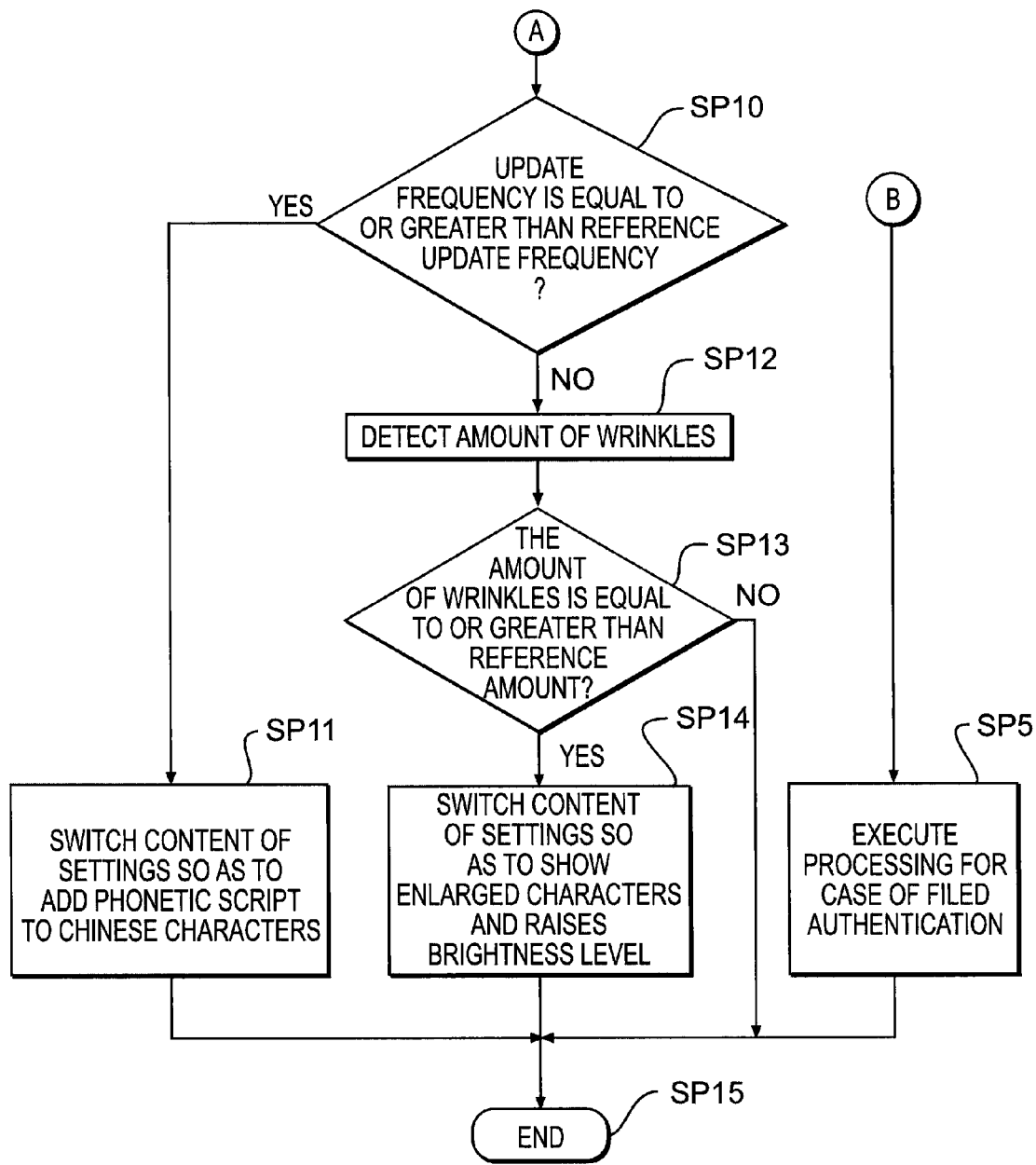

An authentication processing procedure for the control unit 11 in the authentication mode will be described with reference to a flowchart shown in FIGS. 7A and 7B.

That is, when the control unit 11 executes the authentication program, the authentication program starts with routine RT1 and goes to next step SP1. In this step, the control unit 11 recovers content of default display settings for the monitor 3, and obtains vein image data obtained as a result picked up by the image pickup unit 6. The authentication processing procedure then goes to next step SP2.

In step SP2, the control unit 11 extracts vein information of an authentication target from the vein image data obtained from the image pickup unit 6, by performing a predetermined processing, and then goes to next step SP3.

In step SP3, the control unit 11 reads registered vein information from the memory 12, and compares this registered vein information with the vein information of the authentication target. The authentication processing procedure then goes to next step SP4.

In step SP4, the control unit 11 determines whether a similarity obtained as a comparison result is equal to or greater than the authentication threshold or not. If a positive result is obtained, the control unit 11 determines that the authentication target can be authenticated as a registrant, and then goes to step SP6.

Otherwise, if a negative result is obtained in step SP4, the negative result implies that the authentication target is not able to be determined to be a registrant. The control unit 11 then goes to next step SP5.

In step SP5 as a processing for failed authentication, the control unit 11 informs the authentication target of that the authentication target is not authenticated as a registrant, visually through the monitor 3. The control unit 11 then goes to step SP15 and terminates the authentication processing.

The control unit 11 switches operations associated with pressing down of the left and right buttons 5a and 5b, in accordance with button setting information associated with the registered vein information. The control unit 11 then goes to next step SP7.

In step SP7, the control unit 11 determines whether the similarity is equal to or greater than the update threshold or not. If a negative result is obtained, the negative result implies that a change rate of veins depending on aging or so is so small that the vein information need not be updated. The control unit 11 then goes to next step SP9.

Otherwise, if a positive result is obtained in step SP7, the positive result implies that the similarity is smaller than the update threshold and veins of the authentication target have greatly changed due to aging or so. The control unit 11 then goes to next step SP8.

In step SP8, the control unit 11 overwrites and updates the registered vein information in the memory 12 with the vein information of the authentication target as new registered vein information. The control unit 11 also generates date data which stores a date of update, and stores the date data into the memory 12, with the date data associated with the registered vein information. Then control unit 11 then goes to next step SP9.

In step SP9, the control unit 11 detects, as an update frequency, a number of updates which have been carried out within a predetermined period, from the date data associated with the vein information of the authentication target. The control unit 11 then goes to next step SP10.

In step SP10, the control unit 11 determines whether the update frequency is equal to or greater than a reference frequency or not. If a positive negative result is obtained, the positive negative result implies that the registered vein information has not substantially been updated. The control unit 11 then goes to next step SP12.

Otherwise, if a negative positive result is obtained in step SP10, the positive result implies that the registered vein information has been frequently updated and therefore is of the child generation in the growth period. The control unit 11 then goes to next step SP11.

In step SP11, the control unit 11 switches the content of display settings so as to additionally show a phonetic script along Chinese characters displayed on the monitor 3. The control unit 11 then goes to next step SP15 and terminates the authentication processing procedure.

In step SP12, the control unit 11 performs an image rotation processing and a filter processing on the vein image data supplied from the image pickup unit 6, to thereby obtain a wrinkle-removed vein image. The control unit 11 then calculates a difference in brightness level between each corresponding pixels in the wrinkle-removed vein image and the vein image of the authentication target, to thereby obtain a wrinkle image, and further binarizes the wrinkle image. The control unit 11 detects, as a wrinkle amount, a number of pixels forming wrinkles projected in the binarized wrinkle image.

In step SP13, the control unit 11 determines whether or not the wrinkle amount is equal to or greater than a reference amount or not. If a positive result is obtained, the positive result implies that the user as the authentication target is in the aged generation. The control unit 11 then goes to next step SP14.

Otherwise, if a negative result is obtained in step SP13, the negative result implies that the user as the authentication target is in the middle generation. The control unit 11 then goes to next step SP15 and terminates the authentication processing procedure.

In step SP14, the control unit 11 switches the content of display settings so as to display characters on the monitor 3 in a character size which is larger by a constant rate than a default size. The control unit 11 also switches the content of display settings so as to raise the brightness level of the monitor 3 to be higher by a constant rate than a default brightness level.

(1-7) Operation and Effect

By the mouse 4 configured as described above, a predetermined generation is detected from a vein image which is obtained as a result of picking up an image of veins in a finger, and content of settings for the personal computer device 1 connected through the interface 14 is switched to content of settings assigned to the predetermined generation.

Therefore, the mouse 4 is capable of automatically switching content of settings for the personal computer device 1, depending on the predetermined generation, without causing the user of the personal computer device 1 to change content of settings for the personal computer device 1 at all. Accordingly, better conveniences are attained without forcing the user to carry out a complicated operation.

The mouse 4 detects an amount of wrinkles from vein image data supplied form the image pickup unit 6. If the amount of wrinkles is equal to or greater than a reference amount, the vein image data is determined to be of an aged generation. Accordingly, the mouse 4 is capable of automatically switching present content of settings for the personal computer device 1 to content of settings assigned to the aged generation.

At this time, the mouse 4 switches content of display settings so as to show characters displayed on the monitor 3 of the personal computer device 1, in a character size which is larger by a constant rate from a default size, and also switches the content of display settings so as to raise the brightness level of the monitor 3 to be higher by a constant rate than a default brightness level. In this manner, the mouse 4 causes characters to be displayed enlarged at a constant rate (particular rate) as well as the brightness level of the monitor 3 to be raised at a constant rate, for aged people for whom small characters are difficult to see due to presbyopia. Accordingly, the aged people can easily and comfortably see the monitor 3 so that better conveniences are achieved.

The mouse 4 is configured so as to perform an image rotation correction on vein image data so that a vein image is rotated to parallelize the growth direction of a finger to a reference direction. As a result, the mouse 4 is capable of accurately detecting wrinkles orthogonal to the growth direction of the finger, and accuracy of detecting an aged generation improves accordingly.

The mouse 4 further detects, as an update frequency, a number of updates which have been performed on registered vein information within a predetermined period. If the update frequency is equal to or greater than a reference frequency, the vein information is determined to be of a child generation. Accordingly, the mouse 4 is capable of automatically switching content of settings for the personal computer device 1 to content of settings assigned to the child generation.

At this time, the mouse 4 switches content of display settings so as to additionally show a phonetic script along Chinese characters displayed on the monitor 3. By adding a phonetic script to Chinese characters in this manner, the mouse 4 allows children who are not able to understand Chinese characters to phonetically read (or pronounce) the Chinese characters. Better conveniences can be attained.

Further, the mouse 4 compares vein information of an authentication target, which is extracted from vein image data obtained by the image pickup unit 6, with registered vein information, to obtain thereby a similarity. If the similarity obtained as a comparison result is smaller than an update threshold, the mouse 4 automatically updates vein information of the authentication target as registered vein information, and generates date data indicating a date when the registered vein information was thus updated. Therefore, the user is not especially needed to take a labor of updating vein information, and conveniences are improved accordingly.

Thus, the mouse 4 detects and distinguishes the child generation and the aged generation from each other. For example, if one personal computer device 1 is shared by a family, the content of settings for the personal computer device 1 can be automatically switched depending on generations of users (as members of the family).

On the other hand, if a similarity obtained as a comparison result by comparing the vein information of the authentication target with the registered vein information is equal to or greater than an authentication threshold, the mouse 4 switches button settings concerning pressing down of the left button 5a and the right button 5b, in accordance with button setting information. Accordingly, better conveniences can be attained.

According to configurations as described above, an assigned generation is detected from a vein image obtained as a result of picking up an image of veins in a finger. Content of settings for the personal computer device 1 connected through the interface 14 is switched depending on the assigned generation. The mouse 4 attains accordingly better conveniences.

(1-8) Other Embodiments

The first embodiment has been described above with reference to a case that a finger is adopted as a portion of a living body. The present invention is not limited to this case but is applicable to a palm, a finger of a foot, or an arm.

Also, the first embodiment has been described with reference to a case of a method for obtaining a vein image picked up by the image pickup unit 6. The present invention is not limited to this case but a vein image can be obtained from the body unit 2 through the interface 14.

Still also, the first embodiment has been described with reference to a case that a number of pixels forming wrinkles in a wrinkle image extracted from vein image data is obtained as a wrinkle amount. However, the present invention is not limited to this case but a number of wrinkles in a wrinkle image extracted from vein image data may be detected as a wrinkle amount from vein image data.

In this case, the mouse 4 determines whether the number of wrinkles in a wrinkle image of an authentication target is equal to or greater than a reference number defined for an aged generation or not. If the number of wrinkles is equal to or greater than the reference number, the mouse 4 determines the wrinkle image is of an aged generation.

Further, the first embodiment has been described with reference to a case that whether a wrinkle amount in a wrinkle image of an authentication target is equal to or greater than a reference amount or not. If the wrinkle amount is equal to or greater than the reference amount, the user as an authentication target is determined to be about fifty years old or older. That is, the aged generation may be about fifty years old or older. However, the present invention is not limited to this case but may be configured so that, insofar as the wrinkle amount is equal to or greater than the reference amount, the user as an authentication target is determined to be about sixty years old or older or about forty years old or older. That is, the aged generation may be about fifty years old or older, or forty years old or older. In this case, for example, the aged generation may further be classified into more detailed plural generations, such as a generation between forty to fifty and a generation between sixty and eighty.

Still also, the first embodiment has been described with reference to a case that the lengthwise direction of a vein image is used as a reference direction when the vein image is rotated. However, the present invention is not limited to this case. For example, if a vein image has a square size, either the horizontal or vertical direction of the vein image can be used as a reference direction.

Still also, the first embodiment has been described with reference to a case that vein information subjected to an image rotation correction is further subjected to a filter processing for dispersing wrinkles appearing in a direction orthogonal to the growth direction from an vein image. The present invention is not limited to this case but a filter processing for dispersing wrinkles appearing in a direction parallel to the growth direction from an vein image may be performed on vein information subjected to an image rotation correction.

In this case, the mouse 4 sets a filter size to sequentially divide a vein image (FIG. 5A), wherein the filter size is shorter in the same direction as the growth direction than in the direction orthogonal to the growth direction, such as a filter size of 5×1 pixels. Further, the mouse 4 substitutes a brightness level of a center pixel at the center of the filter size with an average brightness level of pixels in the filter size. In this manner, the wrinkle removing filter unit 31 is capable of dispersing wrinkles appearing in the direction parallel to the growth direction from the vein image.

Still also, the first embodiment has been described with reference to a case that the wrinkle removing filter unit 31 obtains vein image data subjected to an image rotation correction from the patterning unit 21. However, the present invention is not limited to this case but an image rotation correction may be performed on vein image data which the wrinkle removing filter unit 31 has obtained from the image pickup unit 6.

Further, the first embodiment has been described with reference to a case that an authentication target is determined to be in the child generation if an update frequency is equal to or greater than a reference frequency wherein a number of updates which have been made in a predetermined period, from date data associated with vein information of the authentication target are detected as the update frequency. However, the present invention is not limited to this case. If a finger width of a finger included in a vein image of an authentication target is detected and if the finger width is shorter than a predetermined length, a user as the authentication target may be determined to be in the child generation.

In this case, the mouse 4 is capable of determining whether an authentication target is in the child generation or not, with respect to vein information which is not registered in the registration unit. Therefore, if a user not registered in the registration unit is determined to be in the child generation, the content of settings for the personal computer device 1 can be automatically switched to content of settings assigned to a child generation. Accordingly, better conveniences can be attained.

Further, the first embodiment has been described with reference to the following case. That is, when detecting a generation, a determination concerning the child generation is made depending on an update frequency based on date data associated with registered vein information, and a determination concerning the aged generation is thereafter made depending on a wrinkle amount in a wrinkle image of an authentication target. However, the present invention is not limited to this case. When detecting a generation, only a determination concerning the child generation may be made from the update frequency based on date data associated with registered vein information. Alternatively, only a determination concerning the aged generation may be made from a wrinkle amount in a wrinkle image of an authentication target.

Still further, the first embodiment has been described with reference to a case that a display style (content of display settings) of the monitor 3 is switched based on a determination result concerning a generation. However, the present invention is not limited to this case. Based on a determination result concerning a generation, content of settings for a program in the main unit 2 may be switched, e.g., content of settings concerning an age limit to be set in an Internet browser may be switched.

Still further, the first embodiment has been described with reference to a case that, if an authentication target is determined to be in the child generation, a phonetic script is shown added to Chinese characters displayed on the monitor 3. However, the present invention is not limited to this case but English displayed on the monitor 3 may be shown transcribed into Japanese katakana characters.

Still further, the first embodiment has been described with reference to a case that a sharpening processing, a binarization processing, and a narrowing processing are sequentially performed on vein image data by the patterning unit 21. However, the present invention is not limited to this case but a part of these processing may be omitted or replaced, or a new processing may be added to these processings. The order of these processing can be changed arbitrarily.

Still further, the first embodiment has been described with reference to a case that the mouse 4 is provided with the control unit 11 which executes various processings. However, the present invention is not limited to this case. For example, the main unit 2 of the personal computer device 1 to which the mouse 4 is connected may be configured to have the same functions as those of the control unit 11.

Specifically, a program for executing the same processings as executed by the control unit 11 of the mouse 4 may be installed into the main unit 2 through a storage medium such as an optical disc or through the Internet, and the program may then be executed from the main unit 2. In this manner, the system constituted of the main unit 2 and the mouse 4 can attain the same effects as obtained in the first embodiment.

Still further, the first embodiment has been described with reference to a case that an authentication processing procedure as described above is executed in accordance with a program stored in the memory 12. However, the present invention is not limited to this case. A program may be installed from a program storage medium, such as a compact disc (CD), a digital versatile disc (DVD), or a semiconductor memory, or may be downloaded from a program distribution server on the Internet. In accordance with the program obtained in this way, the authentication processing procedure as described above may be executed.

Still further, the first embodiment of the present invention has been described with reference to a case that the mouse 4 is constituted of the image pickup unit 6 as an obtaining unit, the generation determination unit 26 as a generation detection unit, and the display setting switch unit 42 as a setting control unit. However, the present invention is not limited to this case but the detection unit and the setting control unit each may be configured to be constituted of other various configurations.

(2) Second Embodiment

(2-1) Structure of Personal Computer

Figure 8:
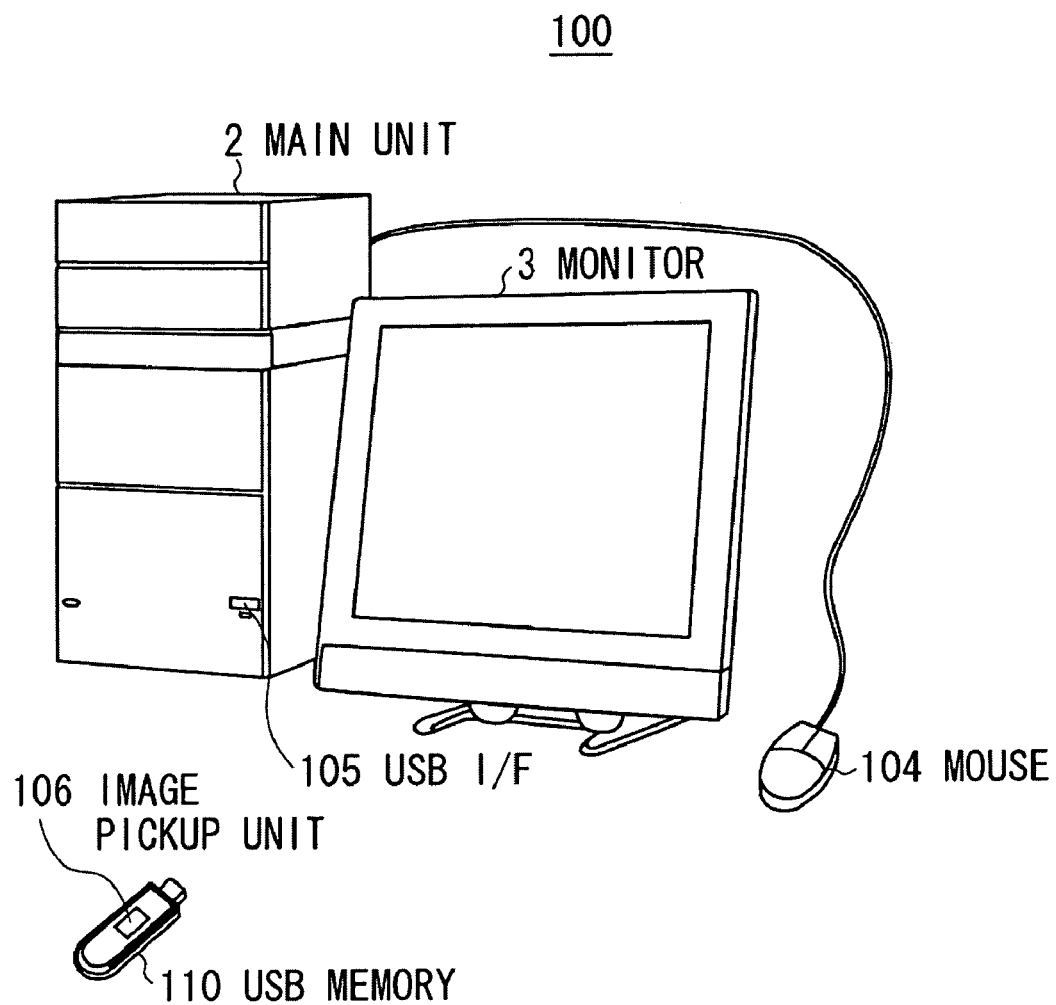
FIG. 8 is a schematic view showing a personal computer device according to a second embodiment of the present invention.

FIG. 8 shows an overall structure of a personal computer device 100 according to the second embodiment wherein parts common to FIG. 1 are denoted at common reference symbols. The personal computer device 100 is constituted by connecting a monitor 3 and a mouse 104 to a main unit 2 which totally controls the personal computer device 100. The monitor 3 serves to display characters and figures on a display screen, based on display data supplied from the main unit 2. The mouse 104 serves as an input device.

The main unit 2 is provided with a USB interface 105 according to USB standards and is configured so that a USB memory 110 can be connected through the USB interface 105. An image pickup unit 106 is provided on an upper surface of the USB memory 110.

(2-2) Circuit Configuration of USB Memory

Figure 9:
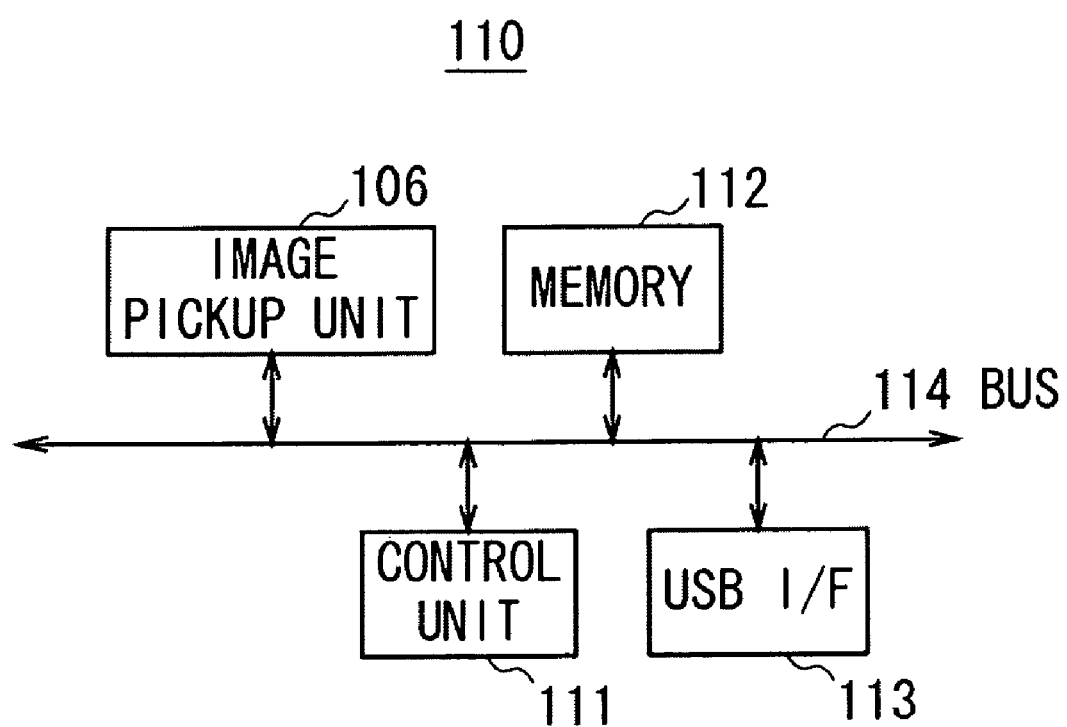
FIG. 9 is a schematic diagram showing a circuit configuration of a USB memory according to the second embodiment.

As shown in FIG. 9, the USB memory 110 is constituted by connecting the image pickup unit 106, a memory 112, and an USB interface 113 to a control unit 111 through a bus 114.

The control unit 111 is constituted as a micro computer including a CPU, a ROM, and a RAM. The CPU totally controls the entire USB memory 110. The ROM stores various programs and setting information. The RAM is used as a work memory for the CPU.

The memory 112 is constituted of, for example, a flash memory and stores or reads data specified by the control unit 111.

Vein information is registered as registered vein information in the memory 112. The vein information is generated as the registration unit (not shown) performs a predetermined processing on vein image data supplied from the image pickup unit 106.

The USB interface 113 is electrically connected to the USB interface 105 of the main unit 2, thereby to exchange various data with the main unit 2.

(2-3) Authentication Mode

An authentication mode will now be described. When the USB memory 110 is connected to the main unit 2 through the USB interface 105, the control unit 111 then executes an authentication mode, based on an authentication program associated with the connection as a result.

Figure 10:
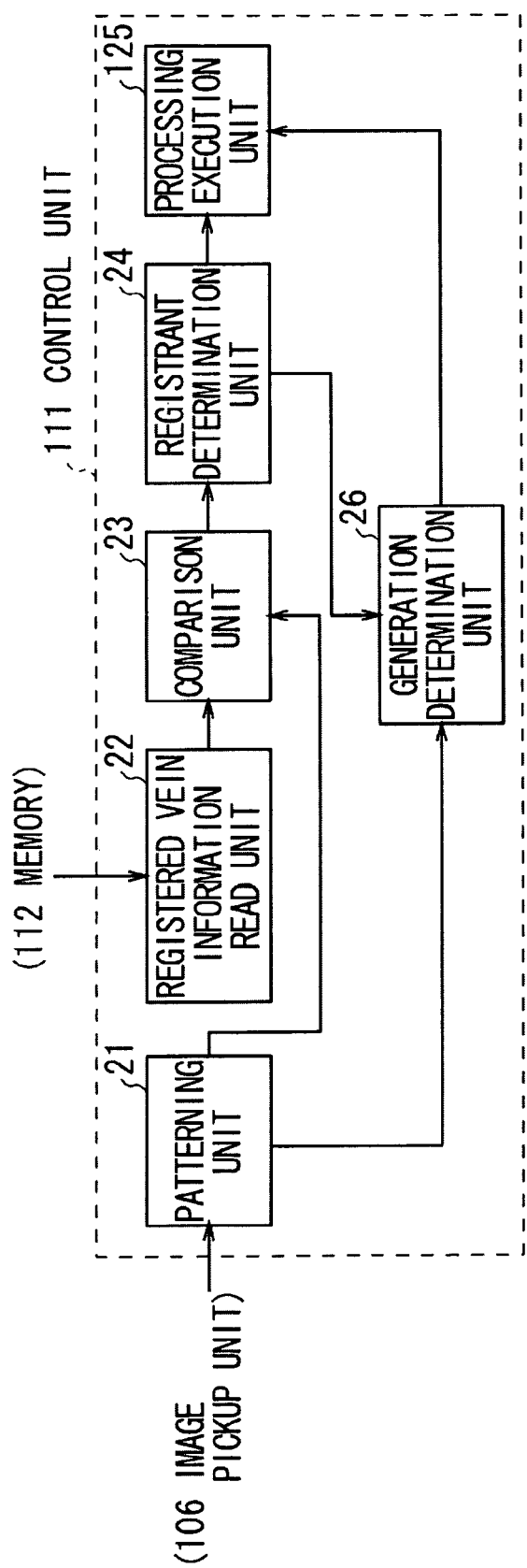
FIG. 10 is a schematic diagram showing a structure of a control unit according to the second embodiment.

At this time, the control unit 111 functions as a patterning unit 21, a registered vein information read unit 22, a comparison unit 23, a registrant determination unit 24, a processing execution unit 125, and a generation determination unit 26, as shown in FIG. 10 in which parts common to FIG. 3 are denoted at common reference symbols.

The patterning unit 21 extracts vein information of an authentication target from vein image data supplied form the image pickup unit 106, by performing the same processing on the vein image data as performed on registered vein information registered in the registration unit. The comparison unit 23 compares registered vein information supplied from the registered vein information read unit 22, with the vein information of the authentication target which has been extracted by the patterning unit 21. The registrant determination unit 24 compares a similarity obtained as a comparison result by the comparison unit 23, with an authentication threshold.

The generation determination unit 26 detects wrinkles included in the vein image data supplied from the image pickup unit 106, and also detects an update frequency from vein information stored in the memory 112. The generation determination unit 26 then determines a generation, based on the wrinkles and the update frequency.

The processing execution unit 125 executes a predetermined processing, depending on an authentication signal obtained as a result determined by the registrant determination unit 24, and depending on a generation determined by the generation determination unit 26.

The processing execution unit 125 has display setting information which associates child and aged generations with content of display settings for the monitor 3. The processing execution unit 125 switches content of display settings, which is presently set in an operation system (OS) of the personal computer device 100, to content of display settings corresponding to a generation signal supplied from the generation determination unit 26.

Specifically, if a child generation signal is supplied from the generation determination unit 26, the processing execution unit 125 then reads content of display setting associated with the child generation from the memory 112, and switches present content of display settings to the read content of display settings for additionally showing a phonetic script along Chinese characters displayed on the monitor 3.

Otherwise, if an aged generation signal is supplied from the generation determination unit 26, the processing execution unit 125 reads content of display se-tings associated with the aged generation from the memory 112, and switches present content of display settings to the read content of display settings for showing characters displayed on the monitor 3 in a character size which is larger at a constant rate than a default character size. The processing execution unit 125 also switches the present content of display settings so as to raise a brightness level of the monitor 3 at a constant rate from a default brightness level.

Still otherwise, if a middle generation signal is supplied from the generation determination unit 26, the processing execution unit 125 maintains present content of display settings for the monitor 3.

On the otherwise, if an authentication success signal is supplied from the registrant determination unit 24, the processing execution unit 125 reads only such various files that are associated with registered vein information, such as document files and spreadsheet files, from the memory 112.

The aforementioned various files are, for example, associated with registered vein information by a setting operation through the main unit 2 which the registrant determination unit 24 performs when vein information is registered as registered vein information or when each document file or spreadsheet file is created. The processing execution unit 125 shows various files read from the memory 112, on the monitor 3.

Otherwise, if an authentication failure signal is supplied from the registrant determination unit 24, the processing execution unit 125 shows only a free volume in the memory 112 on the monitor 3.

(2-4) Operation and Effect

In the configuration as described above, the USB memory 110 detects a predetermined generation from a vain image obtained as a result of picking up an image of veins in a finger. The USB memory 110 further switches content of settings for the personal computer device 100 connected through the USB interface 114, to content of settings assigned to the predetermined generation.

Therefore, the USB memory 110 is capable of automatically switching content of settings for the personal computer device 100, depending on the predetermined generation, without causing the user of the personal computer device 100 to change content of settings for the personal computer device 100 at all. Accordingly, better conveniences are attained without forcing the user to carry out complicated operation.

If an authentication success signal is supplied from the registrant determination unit 24, the USB memory 110 reads only such various files that are associated with registered vein information stored in the memory 112, such as document files and spreadsheet files, from the memory 112, and displays the various files on the monitor 3.

Otherwise, if an authentication failure signal is supplied from the registrant determination unit 24, the USB memory 110 shows only a free volume in the memory 112.

In this manner, when the USB memory 110 is shared by plural registrants and when the USB memory 110 is used by a user other than registrants, only such various files that are associated with an authenticated registrant are displayed on the monitor 3 by the USB memory 110. Therefore, various files which are associated with other people than the authenticated registrant are not displayed on the monitor 3. Accordingly, files related to a user need not be searched for from among numerous various files not related to the user, and better conveniences are attained accordingly.

In this case, the USB memory 110 does not allow various files associated with the authenticated registrant to be shown on the monitor 3 to other people than the authenticated registrant. Therefore, various files associated with the authenticated registrant are not browsed or altered by other people than the authenticated registrant. Accordingly, better conveniences are attained.

(2-5) Other Embodiments

The second embodiment has been described above with reference to a case that the present invention is applied to the USB memory 110. However, the present invention is not limited to this case but may be applied to, for example, a memory card or the like.

(3) Third Embodiment (3-1) Structure of Toilet System

Figure 11:
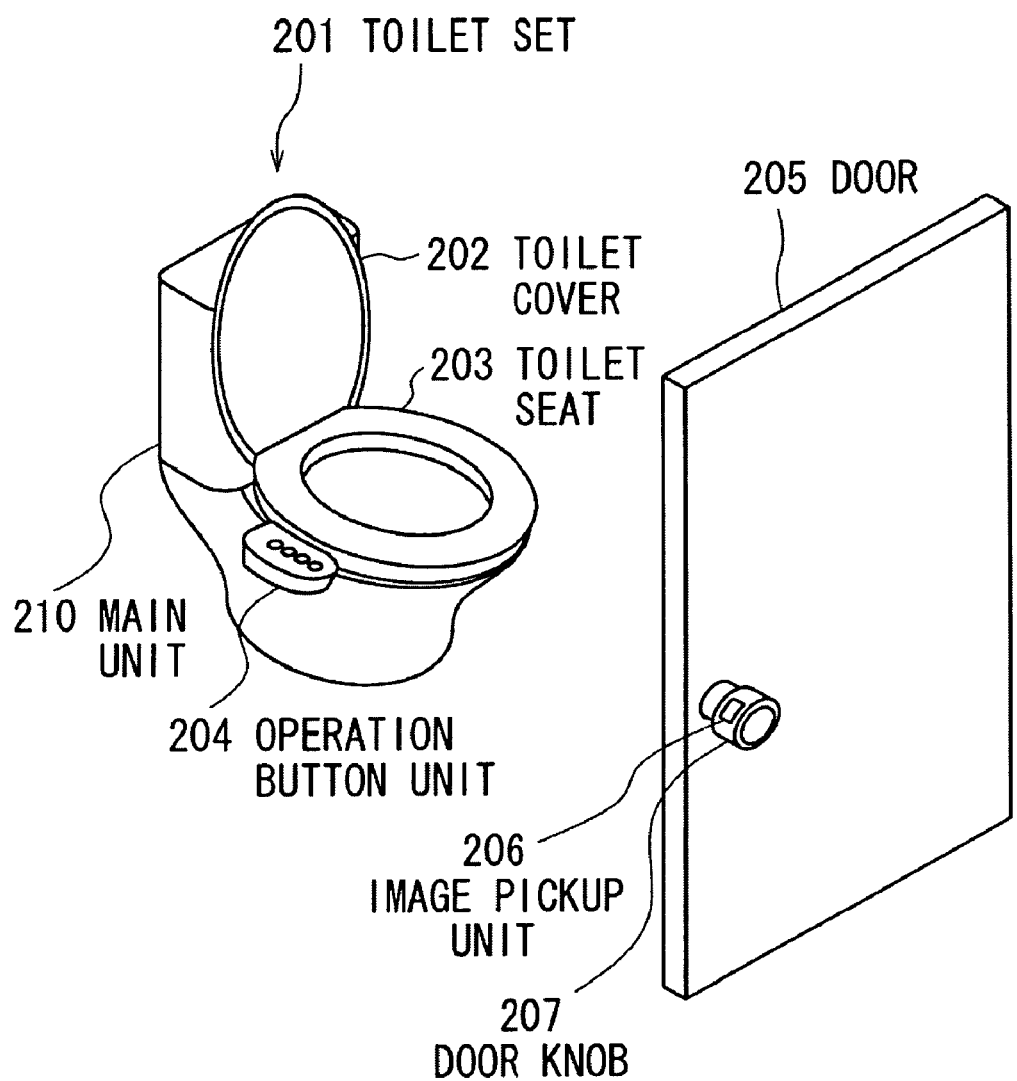
FIG. 11 is a schematic diagram showing a circuit configuration of a toilet system according to a third embodiment of the present invention.

FIG. 11 shows an overall structure of a toilet system 200 according to the third embodiment. The toilet system 200 is constituted of a toilet set 201 and a door 205 which opens and closes a space where the toilet set 201 is placed.

In the toilet set 201, a main unit 210 is equipped with a toilet cover 202, toilet seat 203, and an operation button unit 204 which can be operated and pressed down by users. The toilet cover 202 and toilet seat 203 each have a driving unit (not shown) and are pivoted so as to stand up and lie down to the main unit 210 as the driving units drive. A door knob 207 is attached to the door 205. The door knob 207 is rotatable, and an image pickup unit 206 is provided on a side surface of the door knob 207.

(3-2) Circuit Configuration of Toilet System

Figure 12:
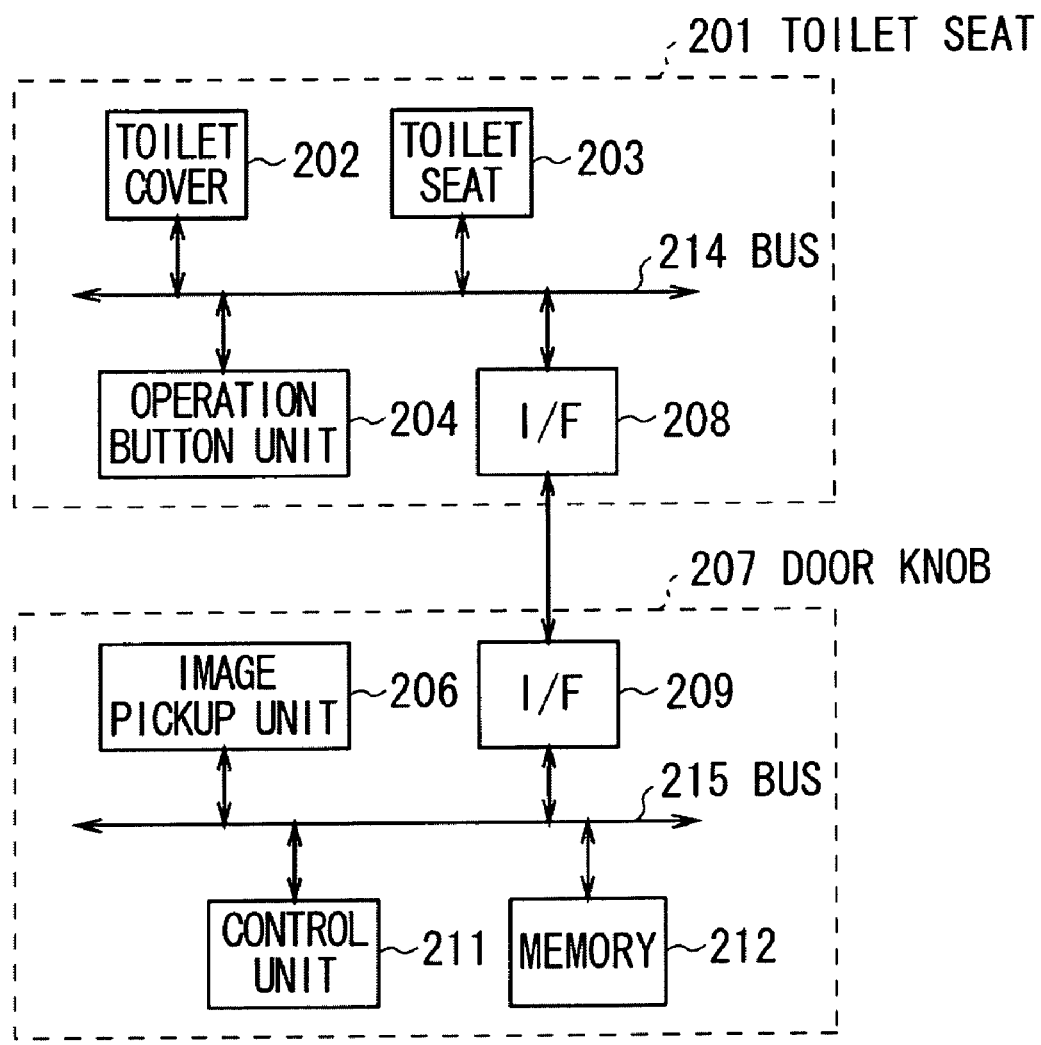
FIG. 12 is a schematic diagram showing a circuit configuration of the toilet system according to the third embodiment.

In the toilet system 200 as shown in FIG. 12, the toilet set 201 is constituted by connecting the toilet cover 202, the toilet seat 203, the operation button unit 204, and an interface 208 through a bus 214. The door knob 207 is constituted by connecting the image pickup unit 206, an interface 209, a control unit 211, and a memory 212 through a bus 215.

The toilet set 201 and door knob 207 are configured to exchange various data between each other since the interface 208 of the toilet set 201 and the interface 209 of the door knob 207 are connected through a predetermined transfer path.

The control unit 211 is constituted as a microcomputer including a CPU, a ROM, and a RAM. The CPU totally controls the entire toilet system 200. The ROM stores various programs and setting information. The RAM is used as a work memory for the CPU.

The memory 212 is constituted of, for example, a flash memory and stores or reads data specified by the control unit 211.

Vein information is registered as registered vein information in the memory 212. The vein information is generated as a registration unit (not shown) performs a predetermined processing on vein image data supplied from the image pickup unit 206.

(3-3) Authentication Mode

An authentication mode will now be described. When the door knob 207 is recognized as being gripped by a user, the control unit 211 executes the authentication mode, based on an authentication program associated with the recognition as a result.

Figure 13:
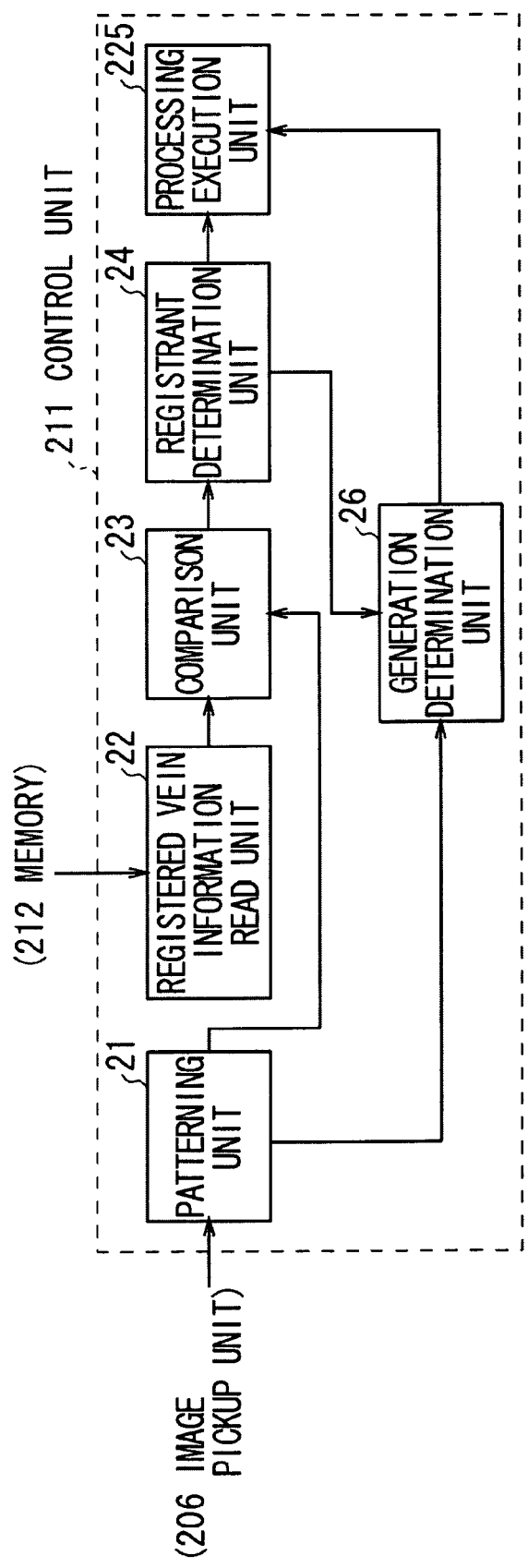
FIG. 13 is a schematic diagram showing a structure of a control unit according to the third embodiment.

At this time, the control unit 211 functions as a patterning unit 21, a registered vein information read unit 22, a comparison unit 23, a registrant determination unit 24, a processing execution unit 225, and a generation determination unit 26, as shown in FIG. 13 in which parts common to FIG. 3 are denoted at common reference symbols.

The patterning unit 21 extracts vein information of an authentication target from vein image data supplied form the image pickup unit 206, by performing the same processing on the vein image data as performed on registered vein information registered in the registration unit. The comparison unit 23 compares registered vein information supplied from the registered vein information read unit 22, with the vein information of the authentication target which has been extracted by the patterning unit 21. The registrant determination unit 24 compares a similarity obtained as a comparison result by the comparison unit 23, with an authentication threshold.

The generation determination unit 26 detects wrinkles included in the vein image data supplied from the image pickup unit 206, and also detects an update frequency from vein information stored in the memory 212. The generation determination unit 26 then determines a generation, based on the wrinkles and the update frequency.

The processing execution unit 225 has nozzle setting information which associates child and aged generations with water pressure settings a cleaning nozzle (not shown) for cleaning a human hip. The processing execution unit 225 switches present content of water pressure settings of a cleaning nozzle to content of nozzle settings which depend on a generation signal supplied from the generation determination unit 26.

Specifically, if a child generation signal is supplied from the generation determination unit 26, the processing execution unit 225 decreases a water pressure of water injected from the cleaning nozzle, to be lower than a default water pressure.

Otherwise, if an aged generation signal is supplied from the generation determination unit 26, the processing execution unit 225 also decreases the water pressure of water injected from the cleaning nozzle, to be lower than the default water pressure, as in the foregoing case of being supplied with a child generation signal.

Still otherwise, if a middle generation signal is supplied from the generation determination unit 26, the processing execution unit 225 maintains the water pressure of water injected from the cleaning nozzle at the default water pressure.

Meanwhile, if an authentication success signal is supplied from the registrant determination unit 24, the processing execution unit 225 reads toilet cover setting information associated with registered vein information.

The toilet cover setting information indicates content of either up settings or down settings. For example, when vein information is registered as registered vein information, the toilet cover setting information is set up and associated with the registered vein information through the operation button unit 204.

If the toilet cover setting information indicates the content of up settings, the processing execution unit 225 causes the toilet cover 202 and toilet seat 203 to stand up by respectively driving the drive units for the toilet cover 202 and toilet seat 203. Otherwise, if the toilet cover setting information indicates the content of down settings, the processing execution unit 225 causes the toilet cover 202 to stand up and the toilet seat 203 to lie down by driving the drive units.

On the other side, if an authentication failure signal is supplied from the registrant determination unit 24, the processing execution unit 225 switches present content of settings for the toilet cover 202 and toilet seat 203 to the content of down settings.

(3-4) Operation and Effect

In the configuration as described above, the toilet system 200 detects a predetermined generation from a vain image obtained as a result of picking up an image of veins in a finger. The toilet system 200 further switches content of settings for the toilet system 200 to content of settings assigned to the predetermined generation.

Therefore, the toilette system 200 is capable of automatically switching content of settings for the toilette system 200, depending on the predetermined generation, without causing the user of the toilette system 200 to change content of settings for the toilette system 200 at all. Accordingly, better conveniences are attained without forcing the user to carry out a complicated operation.

Further, the toilette system 200 compares vein information of an authentication target with registered vein information registered in the registration unit, to obtain a similarity as a comparison result. If the similarity is equal to or greater than an authentication threshold, the toilet system 200 executes content of settings associated with the registered vein information. Accordingly, the toilette system 200 is capable of causing one or both of the toilet cover 202 and toilet seat 203 to automatically stand up or lie down in accordance with use purpose, so that better conveniences are attained.

Further, in the toilette system 200, content of up settings or down settings is associated with each item of registered vein information. For example, if vein information is registered with content of up settings or down settings associated with each of different fingers in case of a male user, content of settings can be switched in accordance with a use purpose only if the user puts a finger associated with either the content of up settings or down settings on the image pickup unit 206. Accordingly, better conveniences are attained.

In the configuration as described above, the toilette system 200 detects a predetermined generation from a vein image obtained as a result of picking up an image of veins in a finger, and switches content of settings for the toilette system 200 to content of settings assigned to the predetermined generation. In this manner, the toilette system 200 attains better conveniences.

(3-5) Other Embodiments

The third embodiment has been described above with reference to a case that content of settings for the cleaning nozzle is switched based on a result of determining a generation. However, the present invention is not limited to this case but content of settings for a temperature of the toilet seat 203 may be switched based on a result of determining a generation.

The present invention is applicable to a mouse which performs vein authentication.

It should be understood by those skilled in the art that various modifications, combinations, sub-combinations and alterations may occur depending on design requirements and other factors insofar as they are within the scope of the appended claims or the equivalents thereof.

What is claimed is:

1. A mouse comprising:
an obtaining unit configured to obtain a vein image;
a comparison unit configured to determine a similarity between the vein image and registered vein information;
a registrant determination unit configured to compare the similarity between the vein image and the registered vein information with a first threshold;
a generation determination unit configured to determine a generation based on an amount of wrinkles detected in the vein image and a frequency by which the registered vein information is updated by the vein image; and
a setting switch unit configured to switch content of predetermined settings based on the determined generation;
wherein the generation determination unit determines whether the similarity between the vein image and the registered vein information is equal to or greater than a second threshold, the second threshold being greater than the first threshold, and
wherein if the similarity between the vein image and the registered vein information is equal to or greater than the first and the second threshold, the registered vein information is updated with the vein image.

2. A mouse according to claim 1, wherein the generation determination unit detects, as the update frequency, a number of updates which have been carried out within a predetermined period and determine whether the update frequency is equal to or greater than a reference frequency defined for a predetermined generation.

3. A mouse according to claim 2, wherein if the update frequency is equal to or larger than the reference frequency, the setting switch unit switches the content of the predetermined settings.

4. A mouse according to claim 3, wherein the setting switch unit switches the content of the predetermined settings to add phonetic script along Chinese characters displayed on a computer.

5. A mouse according to claim 2, wherein if the update frequency is not equal to or larger than the reference frequency, the generation determination unit determines whether the detected wrinkle amount is equal to or greater than a reference wrinkle amount defined for a predetermined generation.

6. A mouse according to claim 5, wherein if the detected wrinkle amount is equal to or greater than the reference wrinkle amount, the setting unit switches the content of the predetermined settings.

7. A mouse according to claim 6, wherein the setting switch unit switches the content of the predetermined settings to show enlarged characters and raises a brightness level of a monitor.

8. A mouse according to claim 5, wherein if the detected wrinkle amount is not equal to or greater than the reference wrinkle amount, the setting unit maintains the content of predetermined settings.

9. A mouse according to claim 1, wherein the vein image is a vein image of a finger and the generation determination unit is configured to rotate the vein image so as to parallelize a growth direction of the finger and a reference direction to each other, and perform a filter processing for dispersing wrinkles appearing in a direction parallel or orthogonal to the growth direction of the finger from the rotated vein image.

10. A mouse according to claim 9, wherein the generation determination unit calculates a difference in brightness level between the vein image obtained by the obtaining unit and the vein image subjected to a filter processing.

11. A mouse according to claim 1, further including a button setting switch unit that switches an operation associated with a pressing action on a button of a mouse, in accordance with button setting information associated with the registered vein information, when the similarity between the vein image and the vein registered information is equal to or greater than the first threshold.

* * * * *